(12) United States Patent
Essick, IV et al.

(10) Patent No.: US 7,475,393 B2
(45) Date of Patent: Jan. 6, 2009

(54) METHOD AND APPARATUS FOR PARALLEL COMPUTATIONS WITH INCOMPLETE INPUT OPERANDS

(75) Inventors: Raymond Brooke Essick, IV, Glen Ellyn, IL (US); Brian Geoffrey Lucas, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 818 days.

(21) Appl. No.: 10/993,971

(22) Filed: Nov. 19, 2004

(65) Prior Publication Data

US 2005/0071835 A1    Mar. 31, 2005

(51) Int. Cl.
  *G06F 9/45*      (2006.01)
(52) U.S. Cl. .................. 717/151; 717/150; 712/229; 712/241
(58) Field of Classification Search .................. 717/150, 717/151, 161; 712/216, 218, 226, 241, 229
  See application file for complete search history.

(56) References Cited

U.S. PATENT DOCUMENTS

| 5,021,945 | A | * | 6/1991 | Morrison et al. ............ 712/216 |
| 5,542,084 | A | | 7/1996 | Lowe, Jr. |
| 5,790,880 | A | * | 8/1998 | Ireton ........................ 712/23 |
| 5,852,729 | A | | 12/1998 | Limberis et al. |
| 6,289,443 | B1 | | 9/2001 | Scales et al. |
| 6,539,541 | B1 | | 3/2003 | Geva |
| 6,912,709 | B2 | * | 6/2005 | Helder et al. ................ 717/161 |
| 7,200,738 | B2 | * | 4/2007 | Crook et al. ................ 712/219 |
| 7,272,704 | B1 | * | 9/2007 | Nguyen et al. .............. 712/241 |
| 2002/0112228 | A1 | | 8/2002 | Granston et al. |
| 2003/0154469 | A1 | | 8/2003 | Anderson et al. |
| 2004/0064682 | A1 | * | 4/2004 | Nguyen et al. .............. 712/226 |
| 2006/0101251 | A1 | * | 5/2006 | Nguyen et al. .............. 712/226 |
| 2006/0190706 | A1 | * | 8/2006 | Baxter et al. ................ 712/218 |

OTHER PUBLICATIONS

Hennessy and Patterson, Computer Architecture A Quantitative Approach, 1996, Morgan Kaufman Publishers, Inc., Second Edition, pp. 239-247.

* cited by examiner

*Primary Examiner*—Lewis A Bullock, Jr.
*Assistant Examiner*—Jue S Wang (57) ABSTRACT

A method and apparatus for performing pipelined computations that include cross-iteration computations. The apparatus includes a functional unit having at least one input and an output, each input being operable to receive an input data value and an associated input data validity tag indicative of the validity of the input data value and the output being operable to provide an output data value and an associated output data validity tag indicative of the validity of the output data value. The first functional unit is operable in a first mode in which an output data value from the first functional unit is valid if all of the input data values are valid, and in a second mode in which the output data value from the first functional unit is valid if any of the input data values is valid.

28 Claims, 12 Drawing Sheets

|  | SRC | FU 1 | FU 2 | FU 3 | SINK | |
|---|---|---|---|---|---|---|
| 0 | A1 |  |  | * | * | ⎫ |
| 1 |  | A2 | * |  |  | ⎪ |
| 2 |  | * | A3 |  |  | ⎬ PROLOG |
| 3 | B1 |  |  | A4 | * | ⎪ |
| 4 |  | B2 | A5 |  |  | ⎪ |
| 5 |  | A6 | B3 |  |  | ⎭ |
| 6 | C1 |  |  | B4 | A7 | ⎫ LOOP |
| 7 |  | C2 | B5 |  |  | ⎬ BODY |
| 8 |  | B6 | C3 |  |  | ⎭ |
| 9 | * |  |  | C4 | B7 | ⎫ |
| 10 |  | * | C5 |  |  | ⎪ |
| 11 |  | C6 | * |  |  | ⎬ EPILOG |
| 12 | * |  |  | * | C7 | ⎪ |
| 13 |  | * | * |  |  | ⎪ |
| 14 |  | * | * |  |  | ⎭ |

TIME STEP

FUNCTIONAL UNITS

*FIG. 1*

| VLIW 1 | C1 |  |  | B4 | A7 | ⎫ LOOP |
|---|---|---|---|---|---|---|
| VLIW 2 |  | C2 | B5 |  |  | ⎬ BODY |
| VLIW 3 |  | B6 | C3 |  |  | ⎭ |

METHOD AND APPARATUS FOR PARALLEL COMPUTATIONS WITH INCOMPLETE INPUT OPERANDS

CROSS REFERENCE TO RELATED APPLICATIONS

This application claims priority to U.S. patent application Ser. No. 10/652,135, titled "Method and Apparatus for Elimination of Prolog and Epilog Instructions in a Vector Processor", filed Aug. 29, 2003.

FIELD

This invention relates generally to the field of Vector Processors. More particularly, certain embodiments consistent with this invention relate to a method and apparatus for unrolling cross-iteration computations in a vector processor.

BACKGROUND

Software pipelining for programmable, very long instruction word (VLIW) computers is a technique for introducing parallelism into machine computation of software loops. If different parts of the software loop use different hardware resources, the computation of one iteration of the loop may be started before the prior iteration has finished, thus reducing the total computation time. In this way several iterations of the loop may be in progress at any one time. In machines controlled by VLIW instructions, the instructions in the middle of the loop (where the pipeline is full) are different from the instructions at the start of the loop (the prolog) and the instructions at the end of the loop (the epilog). If a computation requires a number of different loops, a relatively large amount of memory is required to store instructions for the epilog and prolog portions of the loops.

Software pipelining for programmable VLIW machines, such as the IA-64, is accomplished by predicating instructions and executing them conditionally as the software pipeline fills and drains. The predication mechanism tags instructions with a predicate that conditions execution and committing of results to the register file in a general-purpose processor. This approach is generalized in these processors because the prediction mechanism is also used for general conditional execution. A disadvantage of this technique is the requirement for a centralized predicate register file.

Loop-unrolling is a common technique to improve the throughput of inner loops. This unrolling increases efficiency in processors having multiple functional units and also allows overlapping of various operational latencies. However, loop-unrolling has shortcomings when the number of input data items is not a multiple of the unrolling factor. This is exacerbated if the one iteration of the calculation uses a value calculated in a different iteration. This is called a cross-iteration dependency.

Loops that accumulate (e.g. dot products) cannot be unrolled for higher concurrency unless the multiple inputs to the accumulator can be managed. For example, if the calculation of a dot product is broken into two parts, the code will not work when an odd number of iterations are required. Previously, loop unrolling techniques use epilog instructions to deal with the residual computations, as described above.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The Reconfigurable Streaming Vector Processor (RSVP) is a statically scheduled VLIW machine that executes dataflow graphs on vector data (data streams) in a highly pipelined fashion. The pipelining of calculations for the RSVP and other VLIW vector processors requires a significant amount of storage (memory) for prolog and epilog instructions. One aspect of the present invention is a method and apparatus that utilizes data validity tags for unrolling cross-iteration computations without the need to store epilog instructions.

The RSVP architecture provides resources for deeply pipelining computations, limited only by the true data dependencies and the resource limitations of the hardware. These deep computational pipelines would require many VLIW control words in the general case both for priming the pipeline (prolog) and draining the pipeline (epilog). In one example, the memory requirement for an MPEG4 encoder was reduced by 74% by eliminating prolog and epilog VLIW control words.

The prolog and epilog instructions are generally a subset of the instructions in the body of the loop. According to the present invention, mechanisms are provided to guard the execution (committing of results) to the correct subset of the loop-body. Consequently, the data path can repeatedly execute the loop-body, thereby eliminating the prolog and epilog code.

By way of example, a simple RSVP routine for performing a quantization operation will be described. The routine is coded in linearized flow form as:

|   | vbegin   | 7f-1f,0 |
|---|----------|---------|
| 1:| vld.s16  | v1      |
| 2:| vsign.s16| 1b      |
| 3:| vmul.s16 | 2b,s2   |
| 4:| vsub.s16 | 1b,3b   |
| 5:| vmul.s32 | 4b,s1   |
| 6:| vasru.s16| 5b,16   |
| 7:| vst.s16  | 6b,v0   |
|   | vend     |         |

This exemplary linearized flow form uses the functional operations:

vld.s16—load an element from a vector of 16-bit values vsign.s16—calculate the sign of an element from a vector of 16-bit values vmul.s16—multiply two 16-bit vector elements vmul.s32—multiply two 32-bit vector elements vsub.s16—subtract two 16-bit vector elements vasru.s16—arithmetic shift right a 16-bit vector element vst.s16—store a 16-bit result vector element.

Figure 1:
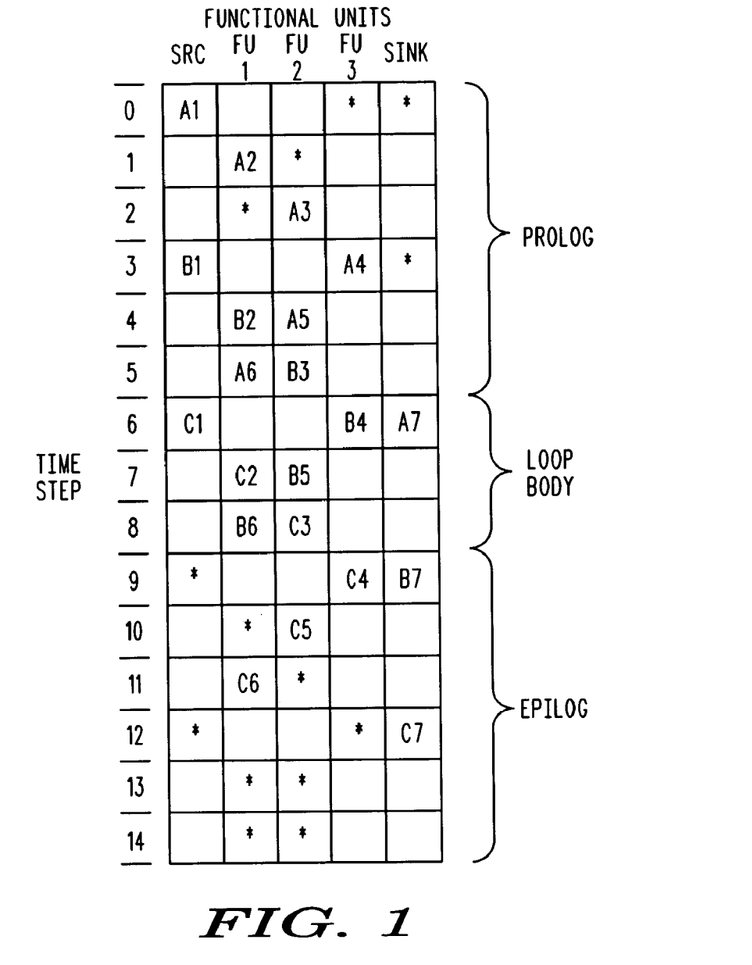
FIG. 1 is an exemplary schedule for a computation.
Figure 2:
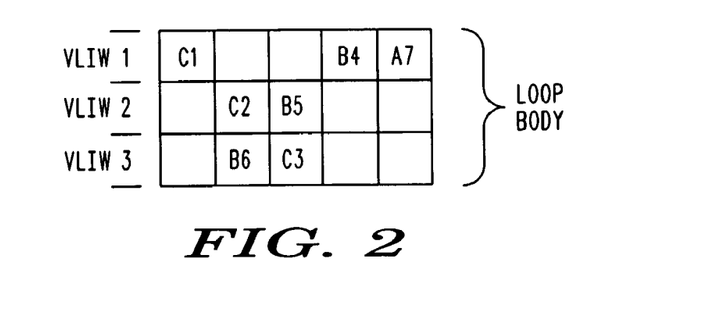
FIG. 2 is a loop body from the exemplary schedule.

FIG. 1 shows how three iterations of the quantization loop can be scheduled. Referring to FIG. 1, each row denotes a time step and each column denotes a hardware functional unit (FU) or hardware resource of the vector processor. SRC denotes a data source or input and SINK denotes a data store or output. In this example, FU 1 is a logic device, FU 2 is a multiplier and FU 3 is an adder. At each time step a VLIW specifies the activity of each functional unit in addition to the location of the data used in the activity. The prefixed letters denote the iteration. For example, B3 is the third node of iteration B. In this example up to three iterations are being processed at one time (in time step 6 for example). The process is pipelined so that a new result is obtained every 3 cycles, whereas a single iteration requires 7 cycles. At the start and end of the computation, the pipeline is not filled, and the asterisks denote invalid data. In prior processors, the sequences of instructions involving invalid data are coded separately and are referred to as the prolog and the epilog. FIG. 1 shows only three iterations of the loop. When multiple iterations are required, three instructions in the loop body are repeated, but the epilog and prologs are unchanged. The loop body is shown in FIG. 2. The loop body comprises three VLIW instructions. In this example, the prolog and epilog have 6 instructions each, while the loop body is only 3 instructions. Thus, the memory required to store the instructions for this computation is reduced significantly if the prolog and epilog are eliminated.

Figure 3:
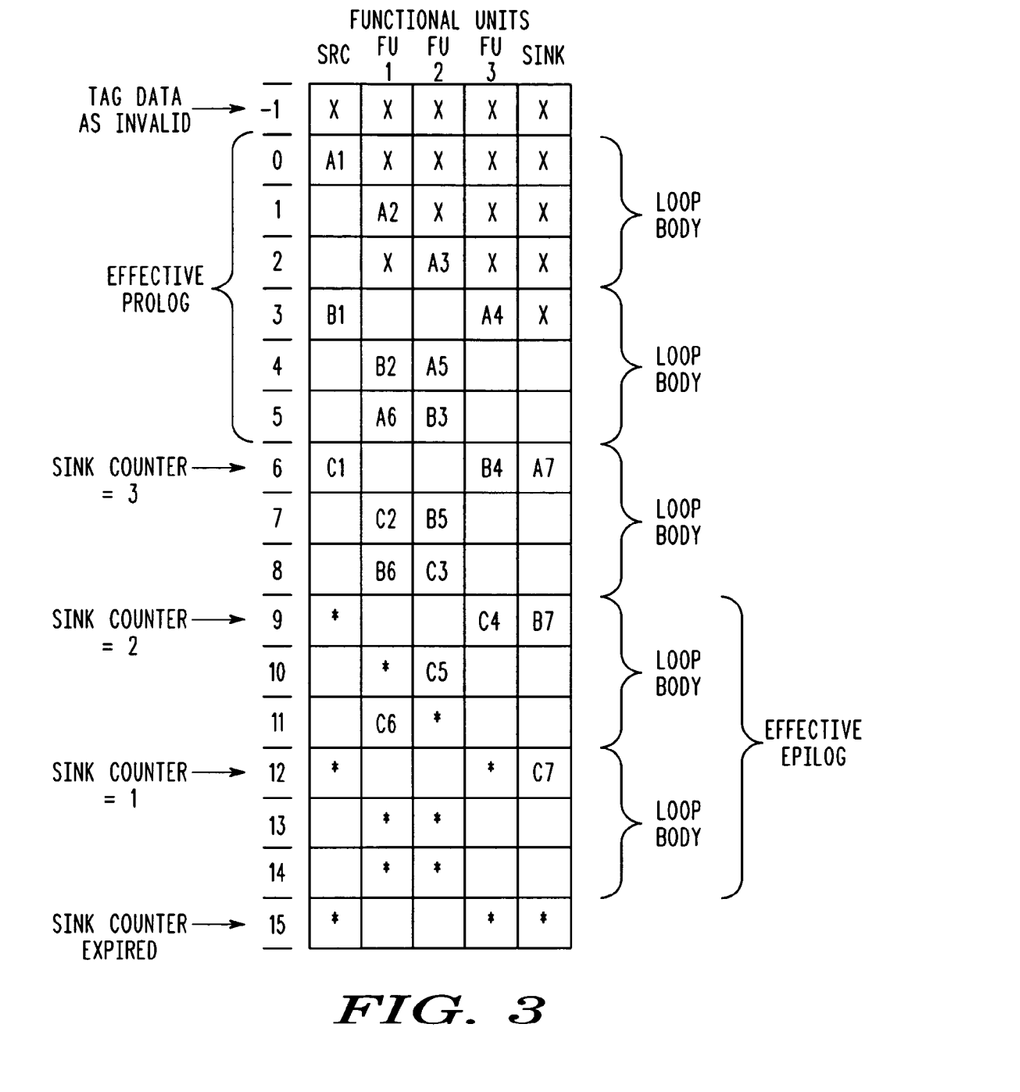
FIG. 3 is an exemplary program schedule illustrating data tags and sink iteration counters of certain embodiments of the present invention.

FIG. 3 illustrates one embodiment of the present invention. In accordance with a first aspect of the invention, data tokens in the functional units include both a data value and a data validity tag, or "valid bit". In a valid state, the data validity tag indicates that the data value is either the result of a valid token source's output, or the result of a calculation performed on all valid inputs. If this is the case, the token may be committed to memory (sunk). Otherwise, if neither condition is met, the data validity tag is in an invalid state and the data token is ignored at the sink, and is not committed to memory. Here, the term memory is taken to include any kind of data store, such as a memory cell or a register. The operation of the processor may be described by a dataflow graph and coded in linearized flow form. When execution of a graph is initiated, the intermediate result registers in the data path are all set to "invalid" so that only data from sources in the current execution of the graph will be committed. In addition, the data validity tags may be used to disable computations, thus saving energy. Referring to FIG. 3, the initialization is indicated by time step −1. The X's denote that data token in the corresponding functional unit or source unit is tagged as invalid. At subsequent time steps, the data tokens are replaced by valid tokens. At time step 0 input data is read and the SRC will contain a valid data token. At time step 2, this data token is passed to FU 1 and the operation A2 results in a valid data token. This process continues until the effective prolog is completed. In this manner, the VLIW instructions from the loop body may be used without alteration during the prolog, and the prolog instructions are eliminated. The data tokens propagate through the graph just as they do in the loop body, but the hardware recognizes when the data is invalid and modifies the processing of the data accordingly.

A second aspect of the present invention is the elimination of the epilog instructions. In one embodiment of this aspect, illustrated in FIG. 3, each token sink has its own copy of the iteration count for the currently executing graph. These iteration counts are decremented under VLIW control, and each sink is aware of its current iteration count. Individual iteration counts may differ due to the deeply pipelined nature of the RSVP. This allows each sink to determine precisely when it needs to stop without referring to any centralized source. In the example shown in FIG. 3, a single sink is used. The sink iteration counter is initialized to three and is decremented at time steps 6, 9 and 12. At time step 3 the data is still tagged as invalid so the data is not sunk and the counter is not decremented. At time step 12 the last data token is sunk and the counter is decremented from 1 to 0. At time step 15 (and any subsequent time steps) the sink iteration counter has expired and the data token is again not sunk. If FU 1 were a sink, its sink counter would be decrement to zero at time step 11. Of course, counters may be incremented to a specified value rather than decremented, or may be decrement to a specified value other than zero. In this manner, the loop body code may be repeated for the epilog, and the epilog instructions are eliminated.

In addition, the input vector stream sources (input VSUs) may have private iteration counts to maintain the correct architectural state at graph completion (so that, architecturally, input addresses are left pointing to the next valid element in the array upon graph completion).

Figure 4:
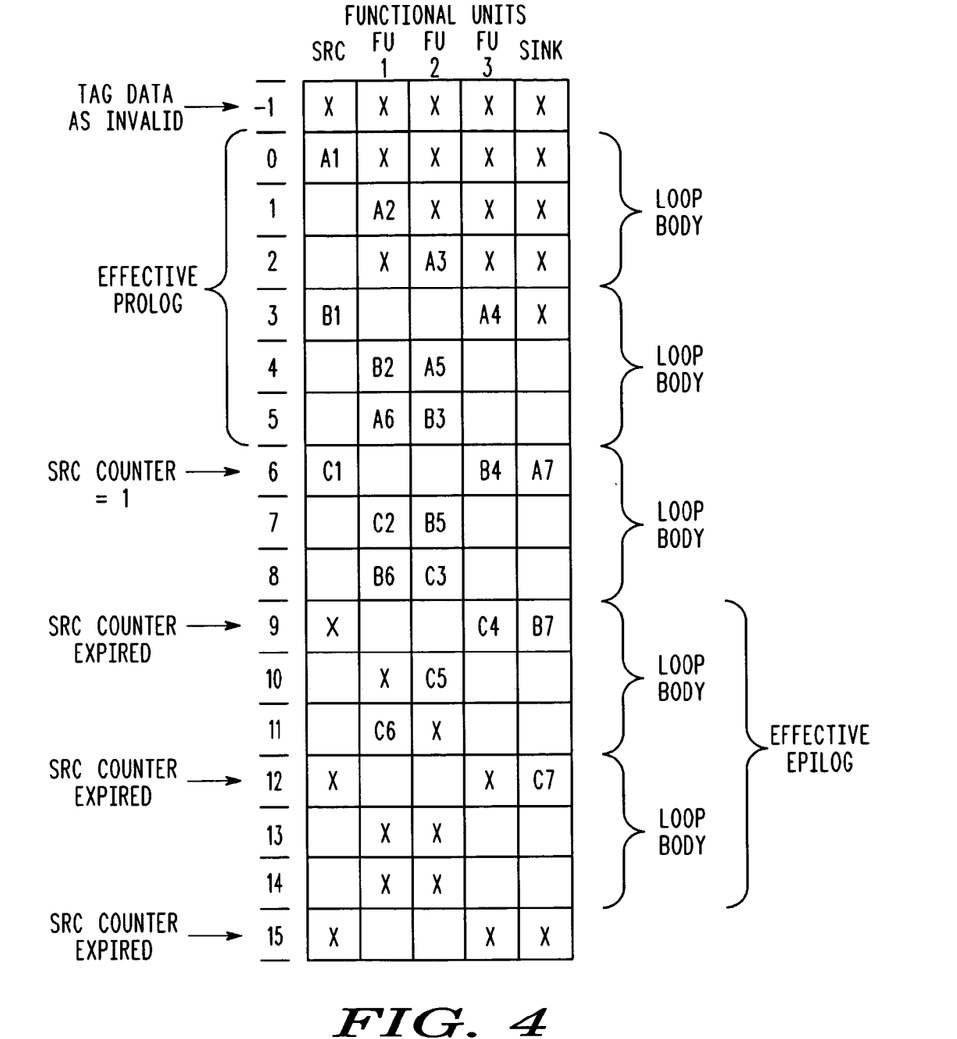
FIG. 4 is an exemplary program schedule illustrating data tags and source iteration counters of certain embodiments of the present invention.

In a further embodiment of the present invention, source iteration counters are used for inputs to eliminate epilog instructions. This approach is illustrated in FIG. 4. Referring to the example shown in FIG. 4, which uses a single source, a source counter is initialized to 3 and is decremented at time steps 0, 3 and 6. At time step 9, the counter has expired, so the data token is marked as invalid (as indicated by the "X"). When the invalid data propagates through to the sink at time step 15, the tag is checked and the token is not sunk. In this approach, other data sources (including constant values stored in registers) may require counters.

Figure 5:
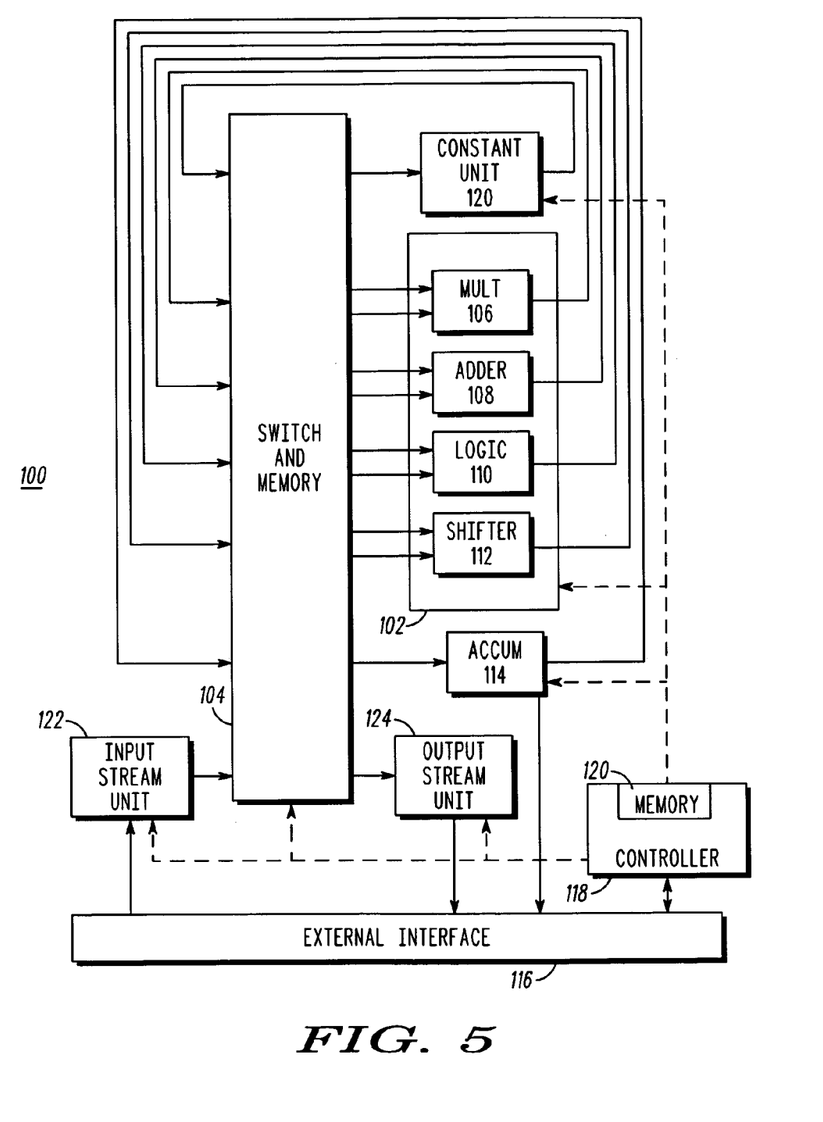
FIG. 5 is a diagrammatic representation of an embodiment of a re-configurable streaming vector processor.

An exemplary embodiment of RVSP hardware 100 is shown in FIG. 5. Referring to FIG. 5, the outputs and inputs of a number of functional units 102 are interconnected via a re-configurable interconnection switch 104. The functional units may include a multiplier 106, an adder 108, a logic unit 110 and a shifter 112. Other functional units may be included, and multiple functional units of a particular type may be included. The outputs from the functional units may be single registers or pipeline registers. The registers allow for storage of data tokens and the associated data validity tags. The functional units may support bit-slice operations. For example, the multiplier may have a 128-bit input and a 128-bit output and be able to perform two 32×32 to 64 or four 16×16 to 32-bit multiplies. In this case, a data validity tag is associated with each data value. The hardware also includes one or more accumulators 114. In accordance with certain embodiments, the accumulators act as both accumulators and storage registers, and are interfaced both to the interconnection switch 104 and to an external interface 116. The accumulators operate as data sinks and as functional elements. The external interface 116 enables the RSVP to link with a host processor and allows the host processor to access the accumulators and other parts of the RSVP. The functional units 102 and the re-configurable interconnection switch 104 define the data-path for the RSVP. The functional units and the re-configurable interconnection switch 104 are linked to a controller 118 that includes a memory 120, preferably a cache, for storing a program of instructions describing the implementation specific description of a data-flow graph of the desired vector computation. At each cycle of the processor clock, the controller produces control words that configure the links in the interconnection switch and drive the function units. Storage and presentation of scalar values and tunnel node functionality is provided by constant unit portion of memory 120. The scalar values and tunnel initialization values may be loaded by the host processor or by the program of instructions. In operation, input data values are provided to the interconnection switch 104 by one or more input-stream units 122 (only one unit is shown the figure). Each input-stream unit 122 is controlled by a set of parameters describing the allocation of data in an external memory. This set of parameters is provided by the host processor, to which the input-stream unit is connected via external interface 116. The output-stream unit 124 is similarly controlled by the host processor and is operable to transfer data from the re-configurable interconnection switch 104 to external memory. The input-stream unit 122 and the output-stream unit 124 are linked to the controller 118 that synchronizes data flow.

Figure 6:
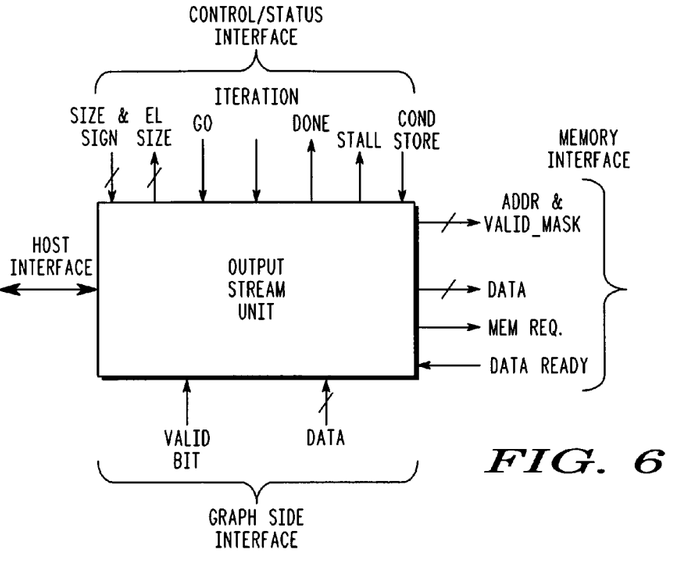
FIG. 6 is an embodiment of an output stream unit of the present invention.

An example of an output stream unit is shown in FIG. 6. Referring to FIG. 6, the output steam unit has a host interface, a memory interface, a control/status interface and a graph-side interface. In operation, the output stream unit is controlled by the control/status interface that is linked to the program controller. The "DONE" indicator signals that the output stream unit has produced its last valid token. The DONE indicator may be asserted when the sink iteration counter of the output stream unit has expired. When all output stream units have signaled that they are finished, the controller knows that the computation has been completed. A "STALL" indicator is asserted if the output stream unit is not ready, as for example when the memory bandwidth is insufficient and the previous data from the graph side interface has not yet been written to memory. The graph-side interface receives data from functional units in the vector processor. In addition to the DATA itself, a data validity tag denoted by the signal VALID BIT is received which indicates if the data is valid. The VALID BIT signal is a digital signal representing one or more data validity tags. The VALID BIT signal is in an asserted state when the data is valid. In a further embodiment, the data comprises a number of sub-words, e.g. four 16-bit data values contained within a 64-bit data word. In this embodiment, four data validity tags (valid bits) are received, one for each sub-word. In accordance with certain embodiments of the invention, the logic for processing the sink iteration counter and for processing the data validity tags is implemented in hardware and an individual counter is associated with each output stream unit or other sink (such as an accumulator). Thus, the mechanism for epilog elimination is distributed.

Figure 7:
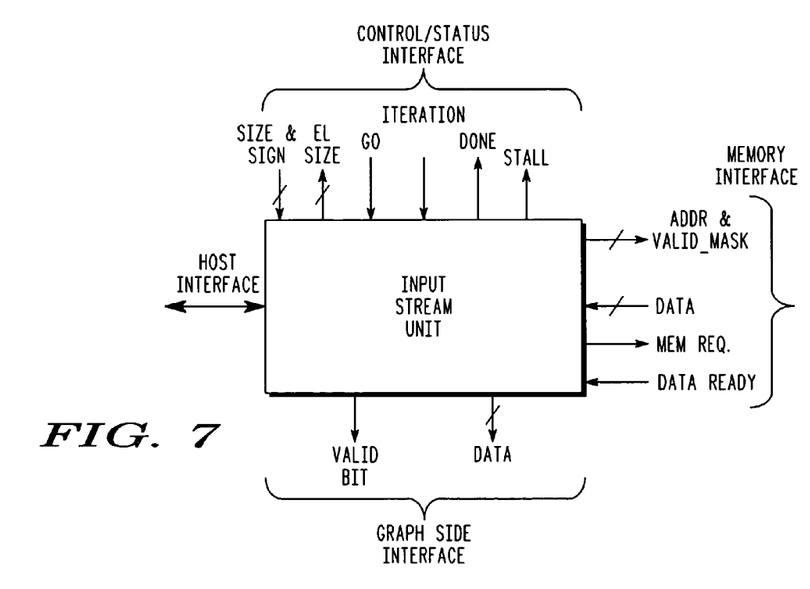
FIG. 7 is an embodiment of an input stream unit of the present invention.

An example of an input stream unit is shown in FIG. 7. Referring to FIG. 7, the input steam unit has a host interface, a memory interface, a control/status interface and graph-side interface. In operation, the input stream unit is controlled by the control/status interface that is linked to the program controller. The "DONE" indicator signals that the input stream unit has produced its last valid token. The DONE indicator may be asserted when the input device has read a specified number of input tokens. A "STALL" indicator is asserted if the data from an external memory is not ready, as for example when the memory bandwidth is insufficient. The graph-side interface provides data to be passed to functional units in the vector processor. In addition to the DATA itself, a data validity tag, denoted by VALID BIT, is passed to the unit. The data validity tag is set if the data is valid. In a further embodiment, the data comprises a number of sub-words, e.g. four 16-bit data values contained within a 64-bit data word. In this embodiment, four data validity tags are used, one for each sub-word.

Figure 8:
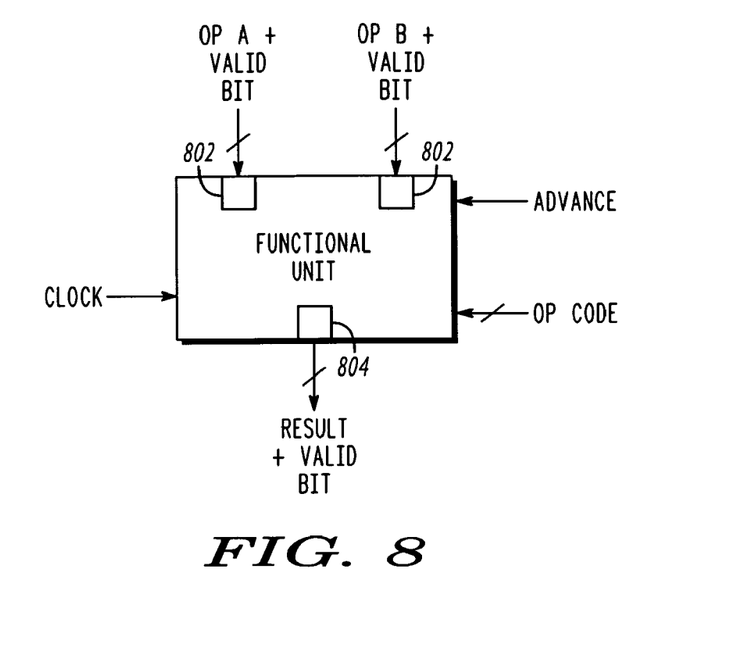
FIG. 8 is an embodiment of a functional unit of the present invention.

FIG. 8 is a diagrammatic representation of an exemplary functional unit of the present invention. Referring to FIG. 8, the functional unit receives one or more input operands (data tokens), indicated as OP A and OP B in the figure. Associated with input operand is a data validity tag that indicates whether the data token is valid. Data tokens may be invalid, for example, if they were produced as a result of operations on other invalid data tokens. The data may comprise a number of sub-words, e.g. four 16-bit data values contained within a 64-bit data word, in which case four VALID BITs are used, one for each sub-word. The functional units are controlled by CLOCK and ADVANCE signals and by instructions (OP CODES) derived from the VLIW instructions processed by the controller. The result of the operation performed in the functional unit is output, together with a corresponding number of VALID BITs. The logic for determining the output data validity tags from the input data validity tags is preferably implemented as hardware in the functional unit, so that no centralized resources are required. The input operands may be stored in registers 802 and the result of the operation may be stored in output register 804.

Figure 9:
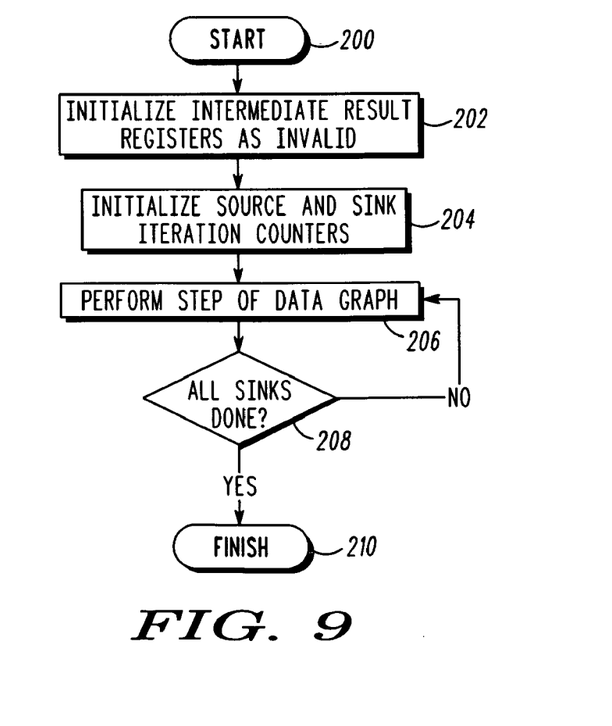
FIG. 9 is flow chart illustrating an embodiment of a method of the invention.

One embodiment of the method of present invention is illustrated in the flow chart in FIG. 9. The flow chart illustrates a method of processing a single pipelined computation in a streaming vector processor. Following start block 200, all of the intermediate storage registers of the processor (e.g. the output registers of functional units) are initialized at block 202 so that the valid bit (data validity tag) of each register indicates that the data value is invalid. The data value need not be initialized, since the valid bit will ensure that it is not used in the subsequent calculation of a result. At block 204, the source and sink iteration counters are initialized. Typically, the initial values are equal to the loop count. At block 206 a step of the data graph (the program of instructions) is performed. This step is described in more detail below with reference to FIGS. 10, 11 and 12. At decision block 208, a check is made to determine if all of the data sinks have finished storing data values. As described below with reference to FIG. 11, each data sink indicates to the controller when it has finished storing results. If all the sinks are not yet finished, as indicated by the negative branch from decision block 208, flow returns to block 206. If all the sinks are done, as indicated by the positive branch from decision block 208, the computation is complete and terminates at block 210.

Figure 10:
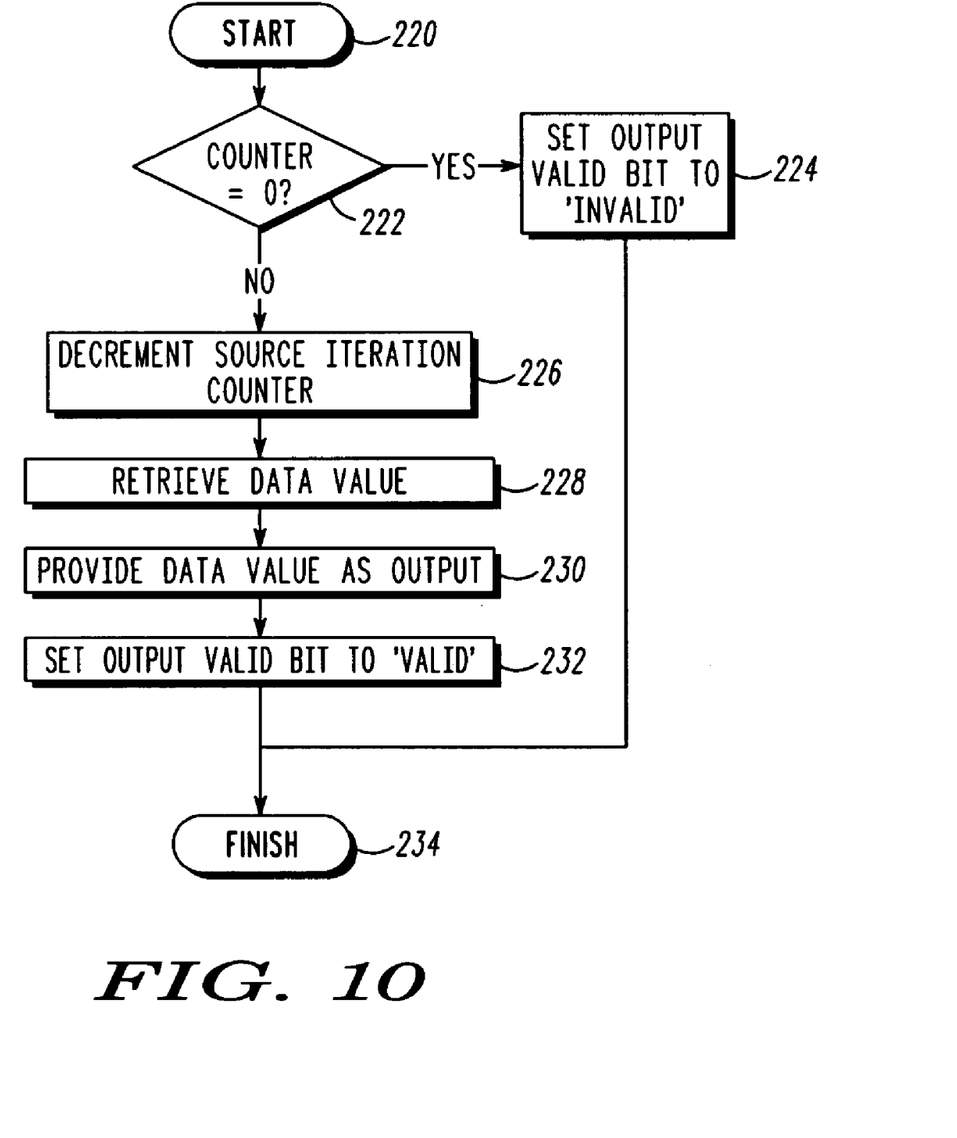
FIG. 10 is flow chart illustrating the operation of a data source element in accordance with certain embodiments of the invention.

The flow chart in FIG. 10 illustrates the method of operation of a source unit for a single program step in a pipelined computation. Following start block 220, a check is made, at decision block 222, to determine if the source iteration counter is equal to zero (expired). If the source iteration counter is expired, as indicated by the positive branch from decision block 222, flow continues to block 224, where the data validity tag associated with the output from the unit is set to indicate that the data is invalid. If the counter has not expired, as indicated by the negative branch from decision block 222, the source iteration counter is decremented at block 226. Each source unit has a counter associated with it. A data value is retrieved from memory at block 228 and, at block 230, the data value is provided as an output. At block 232 the data validity tag associated with the data value is set to indicate that the value is valid and may be used in subsequent computations. The process terminates at block 234. Thus, the output data value is tagged with a data validity tag, which indicates the validity of the data value.

Figure 11:
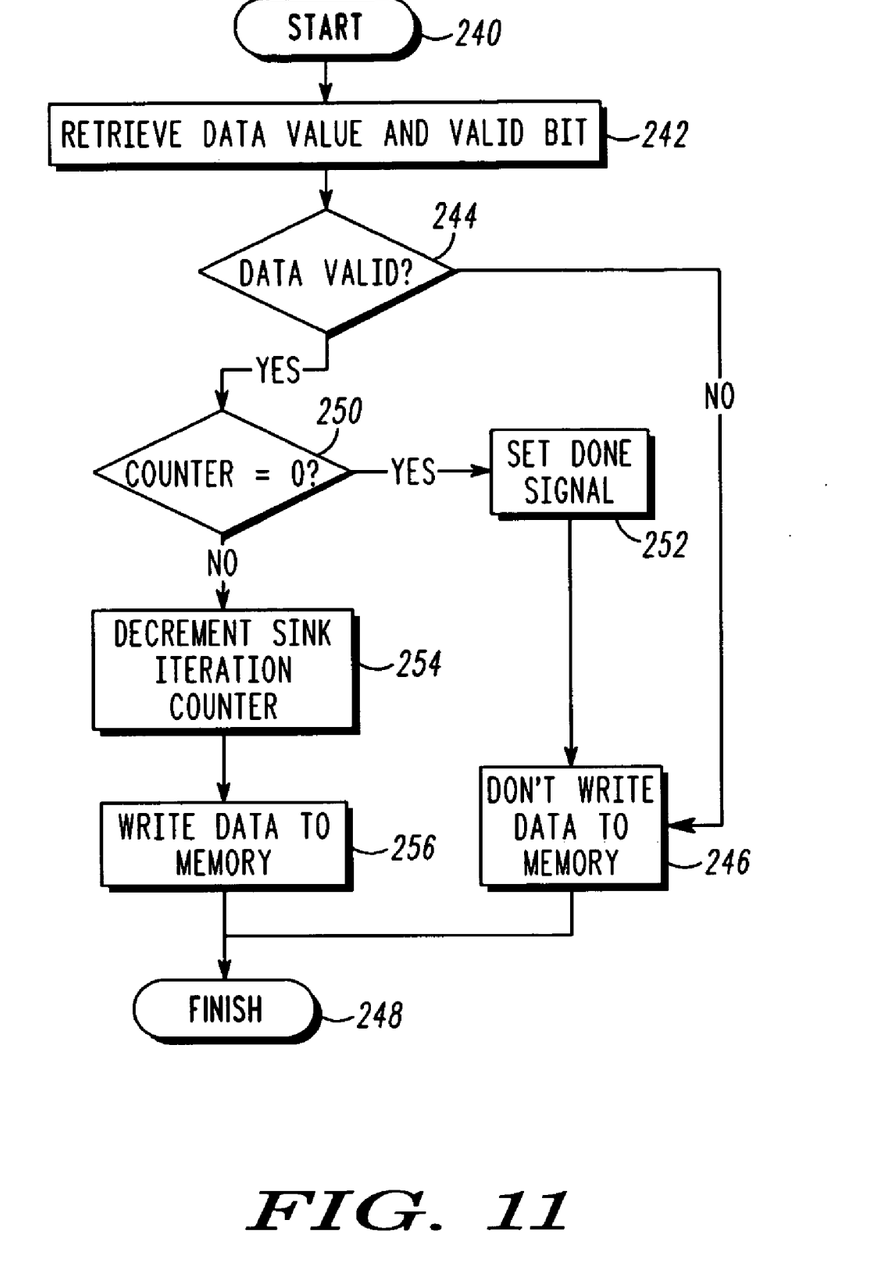
FIG. 11 is flow chart illustrating the operation of a data sink element in accordance with certain embodiments of the invention.

The flow chart in FIG. 11 illustrates the method of operation of a sink unit for a single program step in a pipelined computation. Following start block 240, the incoming data value and the associated data validity tag are retrieved at block 242. At decision block 244 the validity of the data value is checked by examining the data validity tag. If the data is invalid, as indicated by the negative branch from decision block 244, the data value is not sunk to memory (block 246) and operation terminates at block 248. If the data is valid, as indicated by the positive branch from decision block 244, a check is made at decision block 250 to see if the sink iteration counter has expired. If it has expired, as indicated by the positive branch from decision block 250, a DONE signal is sent to the controller at block 252 to indicate that this source unit has completed its task for the current program loop. If the sink counter has not expired, as indicated by the negative branch from decision block 250, the sink iteration counter associated with this sink unit is decremented at block 254 and the data value is committed to memory at block 256. The process terminates at block 248.

Figure 12:
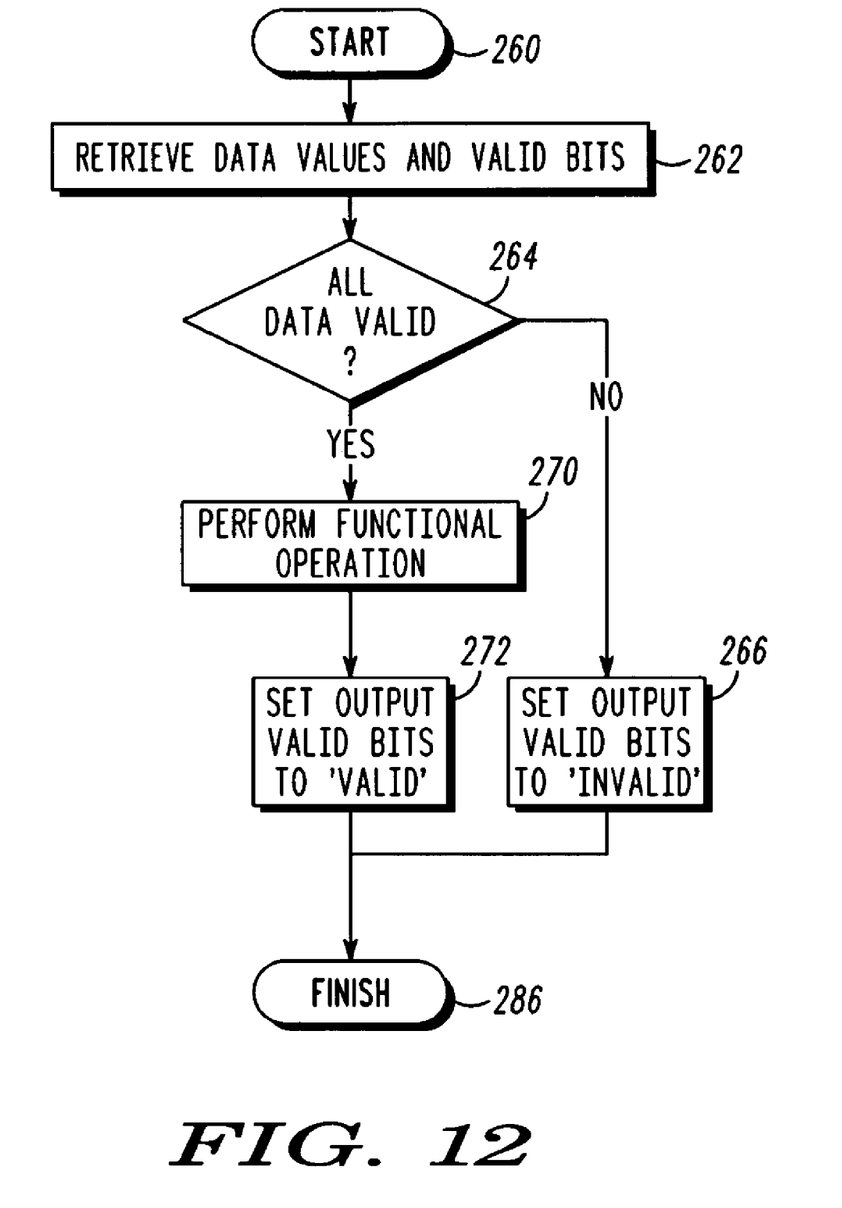
FIG. 12 is flow chart illustrating the operation of a functional element in accordance with certain embodiments of the invention.

The flow chart in FIG. 12 illustrates one embodiment of the method of operation of a functional (computational) unit of the vector processor. Following start block 260, the data values corresponding to the input operands are retrieved at block 262, together with the associated data validity tag for each data value. At decision block 264, the data validity tags are checked to determine if all data values to be used in the computation are valid. If not, as indicated by the negative branch from decision block 264, the data validity tag(s) associated with the output data value are set to indicate that the output data is invalid. If the input data is valid, as indicated by the positive branch from decision block 264, the functional operation is performed at block 270 and the output data value is calculated. At block 272, the data validity tag associated with the output data value is set to indicate that the data is valid and the process terminates at block 268.

Figure 13:
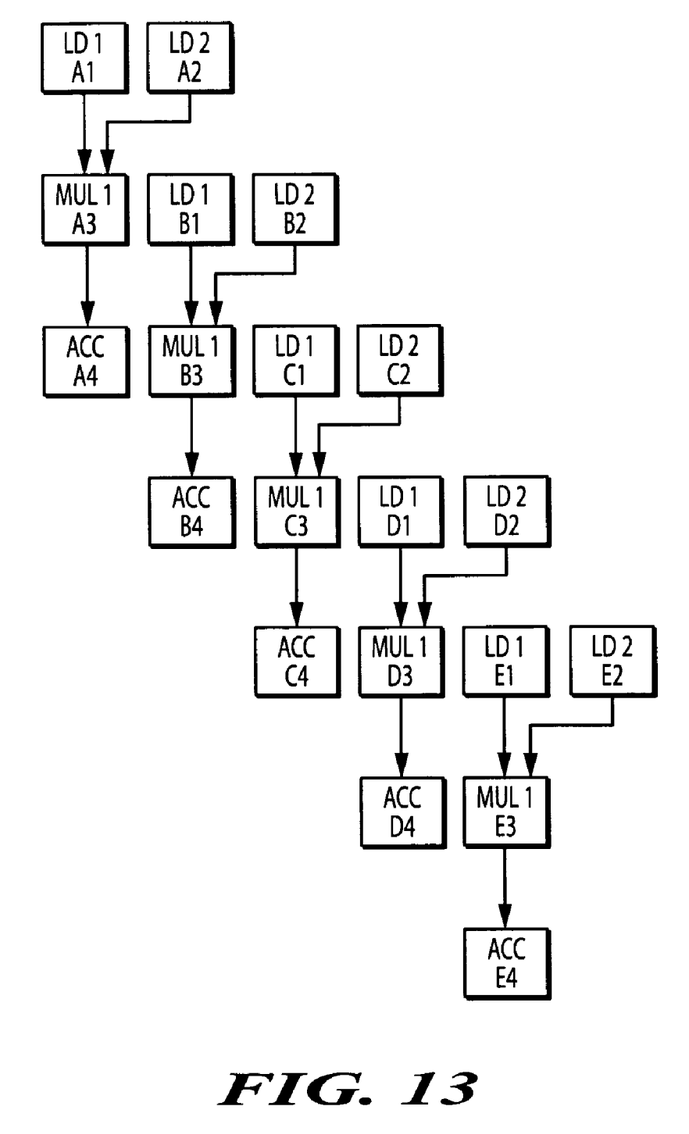
FIG. 13 is a diagrammatic representation of a dot product computation without loop-unrolling.

An example of the computation of the dot product of two vectors is shown in FIG. 13. Each iteration forms the next term in the sum of products which is added in an accumulator. Referring to FIG. 13, the first iteration of the computation is denoted by the nodes A1, A2, A3 and A4. At nodes A1 and A2, an element from each vector is loaded from memory, at node A3 the two elements are multiplied together and at node A4, the result of the multiplication is added into an accumulator (which is assumed to have been set to an appropriate initial value). The nodes B1-B4 denote the next iteration of the computation and the nodes C1-C4 denote the third iteration. In this example, only one term in the dot product is calculated in each cycle.

Figure 14:
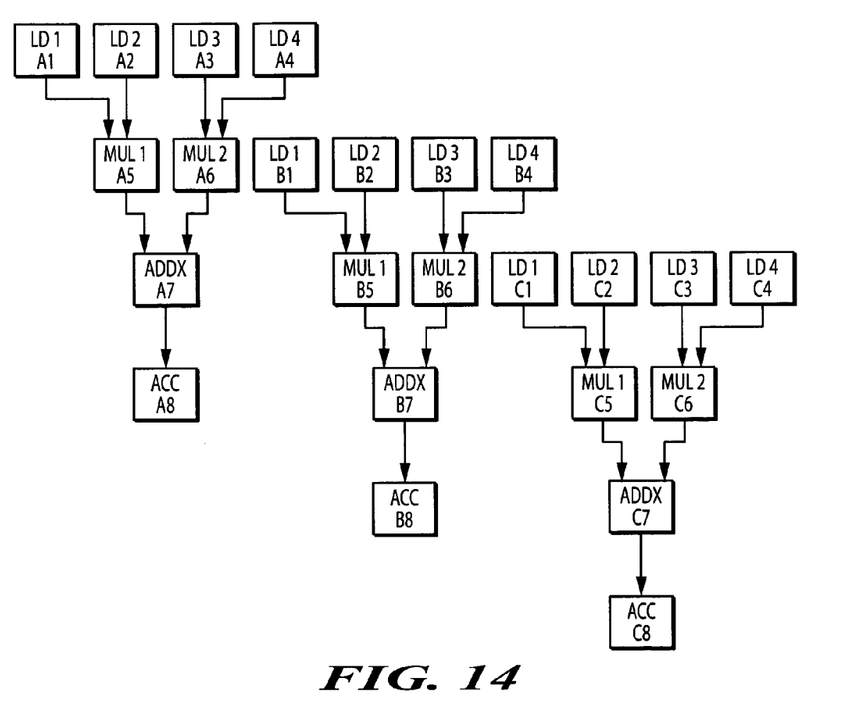
FIG. 14 is a diagrammatic representation of a dot product computation with loop-unrolling.

An alternative computation of a dot product is shown in FIG. 14. In FIG. 14 the loop has been unrolled. Loop unrolling is the process of expanding a loop so each new loop cycle contains several iterations of the computation that was previously performed in a single loop cycle. Prior loop unrolling techniques use extra code to deal with the "residual" iterations. For example, if a loop is unrolled four times, the traditional solution is to execute a loop until there are less than four iterations remaining, and then execute a different copy of the loop that starts only one iteration per loop cycle. FIG. 14 is an example of the same loop unrolled 2 times. Two multipliers are used so that two iterations in the computation are calculated in each cycle. In this example, an additional functional element ADDX (an adder) is used. In each cycle, two elements are loaded from each vector. Hence, if the vector has an odd number of elements, only one valid element remains to be loaded from each vector during the final loop cycle. The ADDX functional element has inputs from two different iterations of the computation. In the simplified example shown, when the vectors have five elements each, the data entering node C6 will be invalid. Consequently, one of the inputs to node C7 will be invalid. The normal valid bit calculations would lead to the output of C7 being tagged invalid. However, because the output from node C5 must be passed along to the accumulator at node C8 to provide the correct result for the dot product computation, the output from the ADDX functional unit should not be tagged as invalid.

In accordance with a further aspect of the present invention, a functional unit is provided that is sensitive to partially valid inputs. In the example of the ADDX element described above, when only one input is tagged as invalid, that input is treated as being zero and the output is tagged as valid. When both inputs are tagged as invalid, the output is tagged as invalid. Of course, when both inputs are tagged as valid, the output is tagged as valid. Equivalently, when only one input is tagged as invalid, the other input is passed through the functional unit and tagged as valid.

The ADDX functional element, and other functional elements described below, may be implemented as a specific hardware element that always treats a mixture of valid and invalid inputs as being partially valid, or it may be implemented as a functional element in which the response to a mixture of valid and invalid inputs is controlled by an operation code or instruction. For example, if the programmer or scheduler determines that the result of an operation on a mixture of valid and invalid inputs should be valid, the functional unit is operated in a first mode. Whereas, if the programmer or scheduler determines that the result of an operation on a mixture of valid and invalid inputs should be invalid, the functional unit is operated in a second mode. The mode of operation may be controlled by an operation code or instruction.

It will be apparent to those of ordinary skill in the art that other functional units may be introduced that are sensitive to partially valid inputs. Examples include MINX (which outputs the minimum of the inputs) and MAXX (which outputs the minimum of the inputs). In this example, when only one input is tagged as invalid, the other input is passed through the functional unit and tagged as valid. Further examples include a functional unit that performs a multiply/accumulate operation and functional units that perform logic operations such as AND, OR and XOR.

Referring again to FIG. 14, node C7 will receive a valid input from node C5 and an invalid input from node C6. Hence the output from node C7 will be the same as the output from C5, so the result of the computation is correct.

Figure 15:
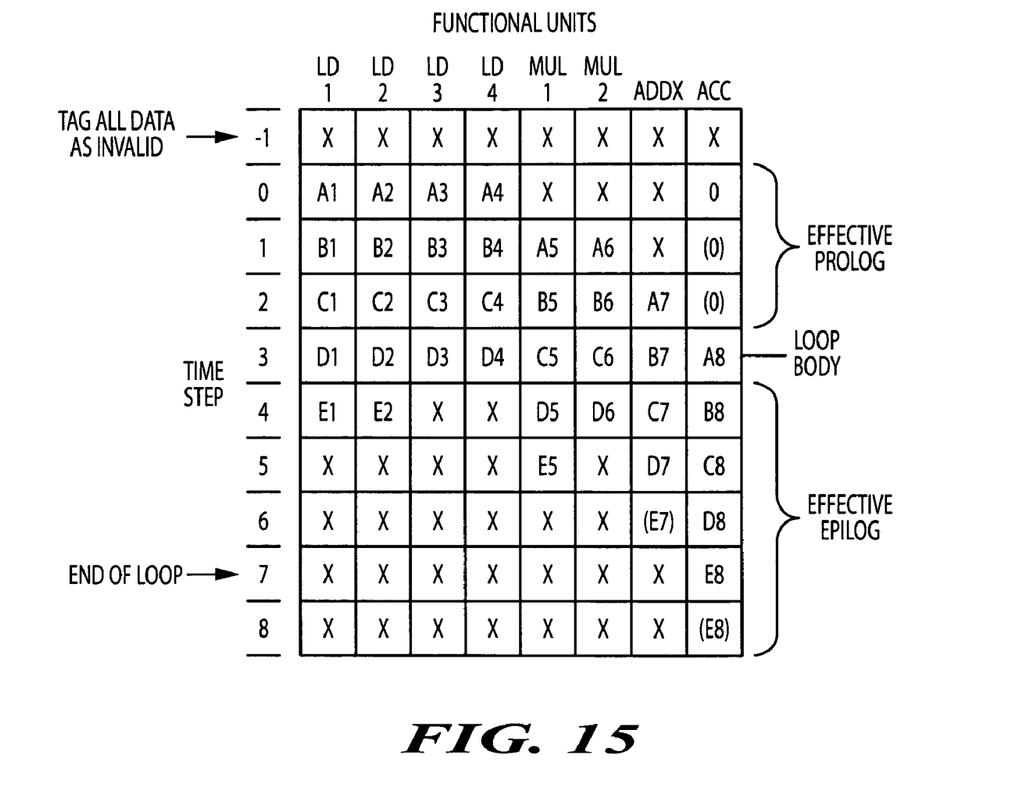
FIG. 15 is an exemplary program schedule illustrating the use of data validity tags in accordance with an embodiment of the present invention.

A further representation of the dot product computation is shown in FIG. 15. The labeling of the nodes corresponds to that in FIG. 14. The computation computes the dot product of vectors having 9 elements. Initially, at time step −1, all outputs are tagged as invalid as denoted by the 'X'. The node identifiers in brackets denote nodes having an invalid input but still producing a valid output.

At step time 0, the accumulator (ACC) is initialized to zero and the two elements of each vector are loaded. At time step 3, the first partial product is added into the accumulator and all of the invalid data has been purged from the functional units. Steps 0-3 form the effective prolog of the computation, but no special code is required. Step 3 forms the loop body of the computation and may be repeated for longer vectors. At time step 4, the last elements of the vectors are loaded. Since there are an odd number of elements, the outputs of LD 3 and LD 4 are tagged as invalid. Consequently, the output of multiplier MUL 2 is invalid in time step 5. Node E7 has one valid input and one invalid input, and so passes the valid input as its valid output to accumulator node E8. The computation ends at time step 7 (this may be indicated by the expiration of a sink counter, for example).

In this example, the accumulator (ACC) functional unit is configured to ignore (or treat as zero) any invalid input. This prevents the initial zero value from being tagged as invalid during the prolog, and allows the accumulated value to persist after the end of the computation (as in time step 8, for example).

It will be apparent to those of ordinary skill in the art that counters, such as the source iteration counter and the sink iteration counter, may be incremented or decremented. The term 'adjusting' will be used in the sequel to mean either incrementing or decrementing. In addition, the counters need not be initialized. Instead, the starting value may be noted and the difference between the starting value and current value used to determine if the counter has expired. Hence, counter initialization is taken to mean setting the counter to a specified value or noting the current value of the counter.

Those of ordinary skill in the art will recognize that the present invention has been described in terms of exemplary embodiments based upon use of RSVP hardware architecture. However, the invention should not be so limited, since the present invention could be implemented using other processors, which are equivalents to the invention as, described and claimed. Similarly, general purpose computers, microprocessor based computers, digital signal processors, microcontrollers, dedicated processors, custom circuits and/or ASICS may be used to construct alternative equivalent embodiments of the present invention. In addition, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Such variations are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A data processor for pipelined computation comprising:
   a first functional unit having at least one input and an output, each input being operable to receive an input data value and an associated input data validity tag indicative of the validity of the input data value and the output being operable to provide an output data value and an associated output data validity tag indicative of the validity of the output data value;
   wherein the first functional unit is operable in a first mode in which an output data value from the first functional unit is valid if all of the input data values are valid, and in a second mode in which the output data value from the first functional unit is valid if any of the input data values is valid.

2. A data processor in accordance with claim 1, wherein the first functional unit is an adder and wherein the output of the adder is equal to the sum of the valid inputs to the adder when the first functional unit is operated in the second mode.

3. A data processor in accordance with claim 1, wherein the first functional unit is a subtraction unit and wherein the output of the subtraction unit is calculated as if any invalid inputs to subtraction unit were zero when the first functional unit is operated in the second mode.

4. A data processor in accordance with claim 1, wherein the first functional unit is a minimum unit and wherein the output of the minimum unit is equal to the minimum of the valid inputs to minimum unit when the first functional unit is operated in the second mode.

5. A data processor in accordance with claim 1, wherein the first functional unit is a maximum unit and wherein the output of the maximum unit is equal to the maximum of the valid inputs to maximum unit when the first functional unit is operated in the second mode.

6. A data processor in accordance with claim 1, wherein the first functional unit is an accumulator and wherein the output of the accumulator is unchanged if the input to the accumulator is invalid when the first functional unit is operated in the second mode.

7. A data processor in accordance with claim 1, wherein the first functional unit includes an output register for storing a data value and an associated data validity tag.

8. A data processor in accordance with claim 1, wherein the first functional unit includes an input register for storing a data value and an associated data validity tag for each input of the first functional unit.

9. A data processor in accordance with claim 1, further comprising:
   a plurality of second functional units; and
   an interconnection switch comprising one or more reconfigurable links, each link operable to couple an output of a functional unit of the first and second functional units to an input of a functional unit of the first and second functional units.

10. A functional unit for a pipelined data processor comprising:
   a) at least one input register operable to receive an input data value and an associated input data validity tag indicative of the validity of the input data value;
   b) an output register operable to store an output data value and an associated output data validity tag indicative of the validity of the output data value; and
   c) a computational unit operable to calculate the output data value and the output data validity tag dependent upon the input data value and the associated input data validity tag of each input register of the at least one input register, wherein the functional unit is operable in a first mode in which an output data value from the functional unit is valid if all of the input data values are valid, and in a second mode in which the output data value from the functional unit is valid if any of the input data values is valid.

11. A functional unit in accordance with claim 10, wherein the functional unit is configured by an operation code and wherein:

the output validity tag is set to valid if all of the input data values are valid;

the output validity tag is set to invalid if all of the input data values are invalid; and the output validity tag is set dependent upon the operational code if at least one input data value is valid and at least one input data value is invalid.

12. A functional unit in accordance with claim 10, wherein the computation unit is an accumulator having an accumulator value, wherein the output validity tag, the accumulator value and the output data value are unaltered if the input data value is invalid.

13. A functional unit in accordance with claim 10, wherein the computation unit is a functional unit selected from the group consisting of an adder, a subtraction unit, a multiply/accumulate unit, a minimum unit and a maximum unit.

14. A functional unit in accordance with claim 10, wherein the computation unit is a logical computation unit selected from the group consisting of an AND unit, an OR unit and an XOR unit.

15. A data processor for pipelined computation comprising:

at least one first functional unit having at least one input and an output, each input being operable to receive an input data value and an associated input data validity tag indicative of the validity of the input data value and the output being operable to provide an output data value and an associated output data validity tag indicative of the validity of the output data value; and at least one second functional unit having at least one input and an output, each input being operable to receive an input data value and an associated input data validity tag indicative of the validity of the input data value and the output being operable to provide an output data value and an associated output data validity tag indicative of the validity of the output data value;

wherein an output data value from a functional unit of the at least one first functional units is valid if all of the input data values are valid in a first mode of the functional unit of the at least one first functional units and the output data value from the functional unit of the at least one first function units is valid if any of the input data values is valid in a second mode of the functional unit of the at least one first functional units, and wherein the output data value from a functional unit of the at least one second functional units is valid if all of the input data values are valid in a first mode of the functional unit of the at least one second functional units and the output data value from the functional unit of the at least one second functional units is valid if any of the input data values is valid in a second mode of the functional unit of the at least one second functional units.

16. A data processor in accordance with claim 15, wherein a functional unit of the at least one first and second functional units includes an output register for storing a data value and an associated data validity tag.

17. A data processor in accordance with claim 15, wherein a functional unit of the at least one first and second of functional units includes an input register for storing a data value and an associated data validity tag for each input of the functional unit.

18. A data processor in accordance with claim 15, further comprising an interconnection switch comprising one or more reconfigurable links, each link operable to couple an output of a functional unit of the first and second functional units to an input of a functional unit of the first and second functional units.

19. A method for executing an unrolled program loop on a processor, the unrolled loop comprising a plurality of iterations of a computation and the processor comprising a plurality of functional units, each functional unit of the plurality of functional units having at least one input for receiving an input data value and an associated input data validity tag and each functional unit of the plurality of functional units being configurable between a first mode of operation and a second mode of operation in response to an operation code, the method comprising, in each cycle of the processor:

a) determining if the input data values are valid by checking the associated input data validity tags, b) if all of the input data values are valid, performing a functional operation on the input data values, storing the result of the functional operation in the result register and setting an associated output data validity tag to indicate that the intermediate result is valid;

c) if the functional unit is configured in the first mode of operation:

if any of the input data values is invalid, setting the associated output data validity tag to indicate that the intermediate result is invalid, and d) if the functional unit is configured in the second mode of operation:

if any of the input data values is valid, setting the associated output data validity tag to indicate that the intermediate result is valid.

20. A method in accordance with claim 19, further comprising:

if the functional unit is configured in the second mode of operation:

the functional unit operating on the valid input data values only.

21. A method in accordance with claim 19 further comprising:

if the functional unit is configured in the second mode of operation:

setting invalid input data values to a functional unit to zero if the functional unit is selected from the group consisting of an adder, a subtraction unit and an accumulator.

22. A method in accordance with claim 19, further comprising:

if the functional unit is configured in the second mode of operation:

setting an output data value from a functional unit to be equal to the minimum of the valid input data values if the functional unit is a minimum unit.

23. A method in accordance with claim 19, further comprising:

if the functional unit is configured in the second mode of operation:

setting an output data value from a functional unit to be equal to the maximum of the valid input data values if the functional unit is a maximum unit.

24. A data processor for performing pipelined computation comprising:
- a first means for performing an arithmetic function, the first means having at least one input and an output, each input being operable to receive an input data value and an associated input data validity tag indicative of the validity of the input data value and the output being operable to provide an output data value and an associated output data validity tag indicative of the validity of the output data value; and
- a second means for performing an arithmetic function, the second means having at least one input and an output, each input being operable to receive an input data value and an associated input data validity tag indicative of the validity of the input data value and the output being operable to provide an output data value and an associated output data validity tag indicative of the validity of the output data value;

wherein the output from the first means is valid if all of the input data values are valid in a first mode of the first means and the output from the first means is valid if any of the input data values is valid in a second mode of the first means, and wherein the output from the second means is valid if all of the input data values are valid in a first mode of the second means and the output from the second means is valid if any of the input data values is valid in a second mode of the second means.

25. A data processor in accordance with claim 24, further comprising an interconnection switching means for coupling any output of the first and second means to any input of the first and second means.

26. A data processor in accordance with claim 24, wherein the first means for performing an arithmetic function and the second means for performing an arithmetic function are implemented as single hardware unit that is operable as a first or second means for performing an arithmetic function dependent upon a control code received by the hardware unit.

27. A data processor for pipelined computation of a data element, comprising:
- a first functional unit having at least one input and an output, each input being operable to receive an input data value and an associated input data validity tag indicative of the validity of the input data value and the output being operable to provide an output data value and an associated output data validity tag indicative of the validity of the output data value;
- wherein the first functional unit is operable in a first mode in which an output data value from the first functional unit is valid if all of the input data values are valid, and in a second mode in which the output data value from the first functional unit is valid if any of the input data values is valid, and
- the data element comprising:
  - a data value portion representing a numerical value of a data element; and
  - a data validity tag representing the validity of the data element;

wherein the use of the data value in an operation is controlled by the value of the data validity tag such that the result of the operation on data elements from the same iteration of a pipelined computation is valid if all data elements input to the computation are valid and the result of the operation on data elements from different iterations of the pipelined computation is valid if any of the data elements input to the computation is valid.

28. A data processor for pipelined computation of a data element, comprising:
- a first functional unit having at least one input and an output, each input being operable to receive an input data value and an associated input data validity tag indicative of the validity of the input data value and the output being operable to provide an output data value and an associated output data validity tag indicative of the validity of the output data value;
- wherein the first functional unit is operable in a first mode in which an output data value from the first functional unit is valid if all of the input data values are valid, and in a second mode in which the output data value from the first functional unit is valid if any of the input data values is valid, and
- the data element comprising:
  - a) a data value portion representing a numerical value of a data element; and
  - b) a data validity tag representing the validity of the data element;

wherein the use of the data value in an operation is controlled by the value of the data validity tag such that the result of the operation on data elements is valid if all data elements input to the computation are valid, invalid if all data elements input to the computation are invalid, and dependent upon the operation if at least one data element input to the computation is valid and at least one data element input to the computation is invalid.

* * * * *